March 6, 1951     J. E. SCRUBY     2,543,873

CENTRIFUGAL CLUTCH

Filed March 20, 1947

Inventor:
John E. Scruby,
by: F. S. Bradbury
Attorney.

Patented Mar. 6, 1951

2,543,873

UNITED STATES PATENT OFFICE 2,543,873

CENTRIFUGAL CLUTCH

John E. Scruby, Visalia, Calif.

Application March 20, 1947, Serial No. 736,060

1 Claim. (Cl. 192—105)

This invention relates to clutch devices and more particularly to that class which is adapted for use in connection with power transmissions of various types wherein it is desirable to gradually transmit driving motion against the starting resistance of driven apparatus. A specific application is in driving the reciprocable driven element or elements of washing machines. In this illustration there is considerable jar, vibration and wear due to frequent and sudden changing in direction of motion. It is therefore desirable to provide a clutch which will introduce a certain amount of lag or gradual clutching action during each clutching operation.

An object of my invention is to provide a construction which is self contained and which compensates wear of the working parts automatically.

Another object is to provide a construction wherein the clutching mechanism is simple, durable and inexpensive to manufacture.

It is further a general object of my invention to provide a clutch construction employing two relatively movable elements, one a driving element and the other a driven element, and to utilize a cluster of relatively small ball weights instead of liquids or friction rubbing surfaces. Actual use of ball filled clutches of this type has shown that they have flexibility in gripping action under centrifugal force and do not slip when the prime mover and the driven element have reached their normal running speed. It is therefore an object of my invention to provide an improved form of clutch construction which is particularly adaptable for use with clusters of ball weights.

With these and other objects in view my invention comprises the features of construction and combination of parts hereinafter described and claimed.

Figure 1:
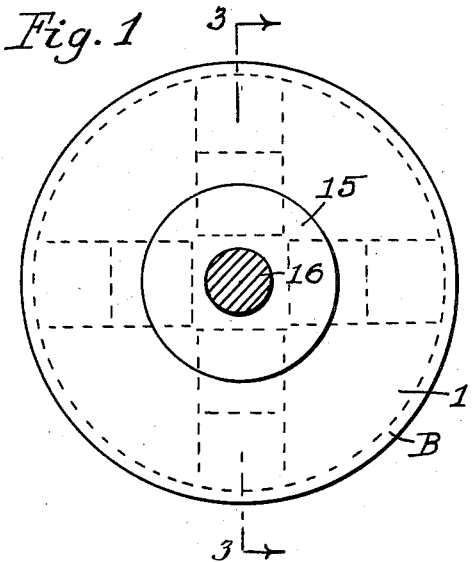
Figure 2:
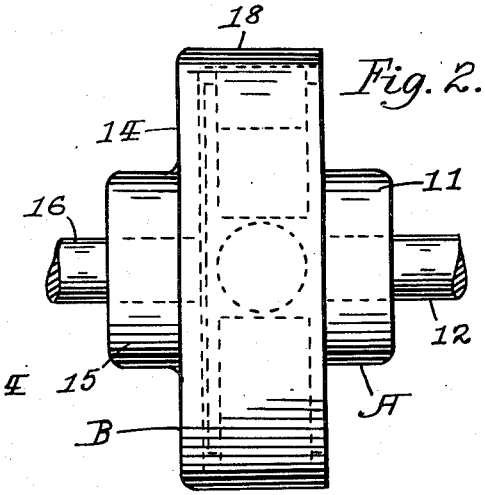
Figure 3:
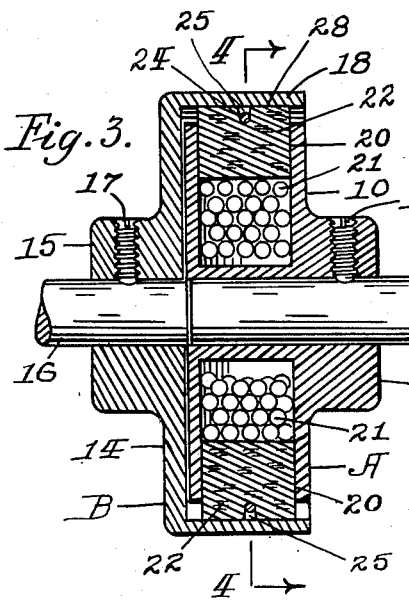
Figure 4:
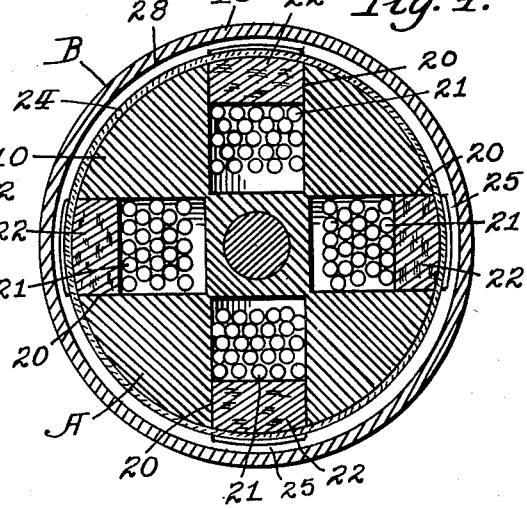

In the accompanying drawing forming part of this specification, Fig. 1 is an end elevation of my improved clutch; Fig. 2 is a side elevation of the structure shown in Fig. 1; Fig. 3 is a longitudinal section taken on the line 3—3 of Fig. 1; and Fig. 4 is a transverse section taken on the line 4—4 of Fig. 3.

In the drawing, A represents the driving element and B the driven element of my improved clutch. The driving element has a circular solid body 10 which is formed with a coaxial integral hub 11, said body and hub being adapted to be mounted coaxially on a driving shaft 12 to which they are secured or keyed by the set screw 13 or other suitable means. The driven member has a disk body 14 formed on a coaxial hub 15, said hub being mounted on a driven shaft 16 to which motion is adapted to be transmitted from the driving shaft. The two shaft members are disposed in coaxial alignment. The inner ends of the two shaft members are preferably spaced apart. The hub 15 is keyed to shaft 16 by the set screw 17. The disk body 14 is formed with a circular outstanding perimeter 18 which is coaxial with said shaft members and encircles the perimeter of the body of the driving element. A free space is arranged between the inner friction surface of the perimeter 18 and the cylindrical surface of the driving element.

The driving element body is formed with a plurality of radially disposed deep sockets or wells 20 which are circumferentially equally spaced apart. Each of these sockets or wells may be cylindrical as shown or any other shape in cross section, the axis of which radiates from the longitudinal axis of the driving element. The inner end portion of each of these sockets or wells contains a cluster or mass of ball weights 21, said balls being relatively heavy and composed of polished steel or other suitable wear resisting material. The polished steel produces antifriction surfaces which reduce any tendency of the balls jamming or sticking together under rubbing contact during centrifugal action of the driving and driven elements. In this manner each individual ball is caused to function freely in contact with all adjacent faces.

A cylindrical friction buffer body 22 composed of cork, solidly pressed asbestos or other suitable material is placed in the outer end portion of each socket or well with its inner end held against the cluster of ball weights therein and its outer end juxtaposed to the inner friction cylindrical surface 28 of the perimeter 18 of the driven element. The buffer body is cylindrical in shape and of substantially outer diameter corresponding with the inner diameter of the companion socket or well so as to slide freely longitudinally therein. Normally when the driving and driven elements are at rest the buffer bodies are held out of contact with the frictional engaging surface 28 by a spring or elastic band 24 which encircles the driving member body 10 and holds all of the buffer bodies in the sockets or wells out of contact with the inner friction engaging surface of the driven member perimeter 18. The resilient band is readily expansible and engages the buffer elements in grooves 25 below the clutching contact surfaces thereof.

The shaft members 12 and 16 are assumed to be journaled in use by suitable journal supports (not shown). When the drive shaft 12 is revolved the ball weights 21 in the sockets or wells 20 are urged outwardly by centrifugal force and as speed increases the friction buffers are gradually caused to engage the inner friction surface 28 of the driven element and thus transmit revolving motion thereto. A certain amount of lag occurs in gripping action which absorbs shock and sudden grabbing tendency. This lag action is highly desirable in many applications of the clutch in practical service. For instance the driving unit in any mechanical movement is allowed to reach full speed before it takes the load it is driving. This means that it is not necessary to have a prime mover larger or greater than the driven unit requires at its running capacity and not its starting load. It also means that on direct connections (that is when a motor shaft is connected to the unit it is driving without being belt driven) there need be no teeth connecting the driving unit with the unit being driven, as in many direct connected units in present use. It has also been found that the driving and driven shafts do not have to be in rigid alignment in order that the apparatus may operate effectively.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than those above set forth within the spirit of the invention and the scope of the following claim.

I claim:

A drive coupling and clutch, comprising a pair of driving and driven shaft members arranged coaxially in close end relationship, driving and driven bodies respectively secured upon said driving and driven shaft members, said driving body having a plurality of radiating cylindrical sockets circumferentially spaced apart about said axis of said driving body, said driven body having an annular rim disposed over the outer ends of said sockets, a mass of ball weights held in each of said sockets having antifriction polished surfaces which prevent sticking, a plurality of cylindrical buffers, each buffer being freely movable with its inner end planted against the mass of ball weights in a companion socket and with its outer end juxtaposed to but normally out of contact with the inner cylindrical surface of said rim, said buffer elements having an annular series of channel sections in their outer ends, an elastic band engaging said buffer elements in said series of channel sections out of contact with the inner surface of said annular rim and normally retaining said buffer sections in contracted condition out of contact with said rim but permitting said buffer elements to expand and engage said rim during the revolution of said shaft sections.

JOHN E. SCRUBY.

REFERENCES CITED

The following references are of record in the file of this patent:

UNITED STATES PATENTS

| Number | Name | Date |
|---|---|---|
| 283,009 | Meyer | Aug. 14, 1883 |
| 1,032,524 | Wiard | July 16, 1912 |
| 1,843,712 | Else | May 24, 1932 |
| 1,859,963 | Futschee | May 24, 1932 |
| 1,910,352 | Mayer | May 23, 1933 |
| 2,000,713 | Norris | May 7, 1935 |
| 2,027,941 | Waterhouse | Jan. 14, 1936 |
| 2,048,372 | Carlsson et al. | July 21, 1936 |
| 2,068,185 | Kreis | Jan. 19, 1937 |
| 2,290,513 | Wemp | July 21, 1942 |

FOREIGN PATENTS

| Number | Country | Date |
|---|---|---|
| 680,413 | Germany | Aug. 28, 1939 |